Nov. 23, 1937.      H. V. JAMES      2,099,890
MEANS FOR REGULATING THE SPEED OF POLYPHASE ALTERNATE CURRENT MOTORS
Filed Oct. 15, 1934      4 Sheets-Sheet 2

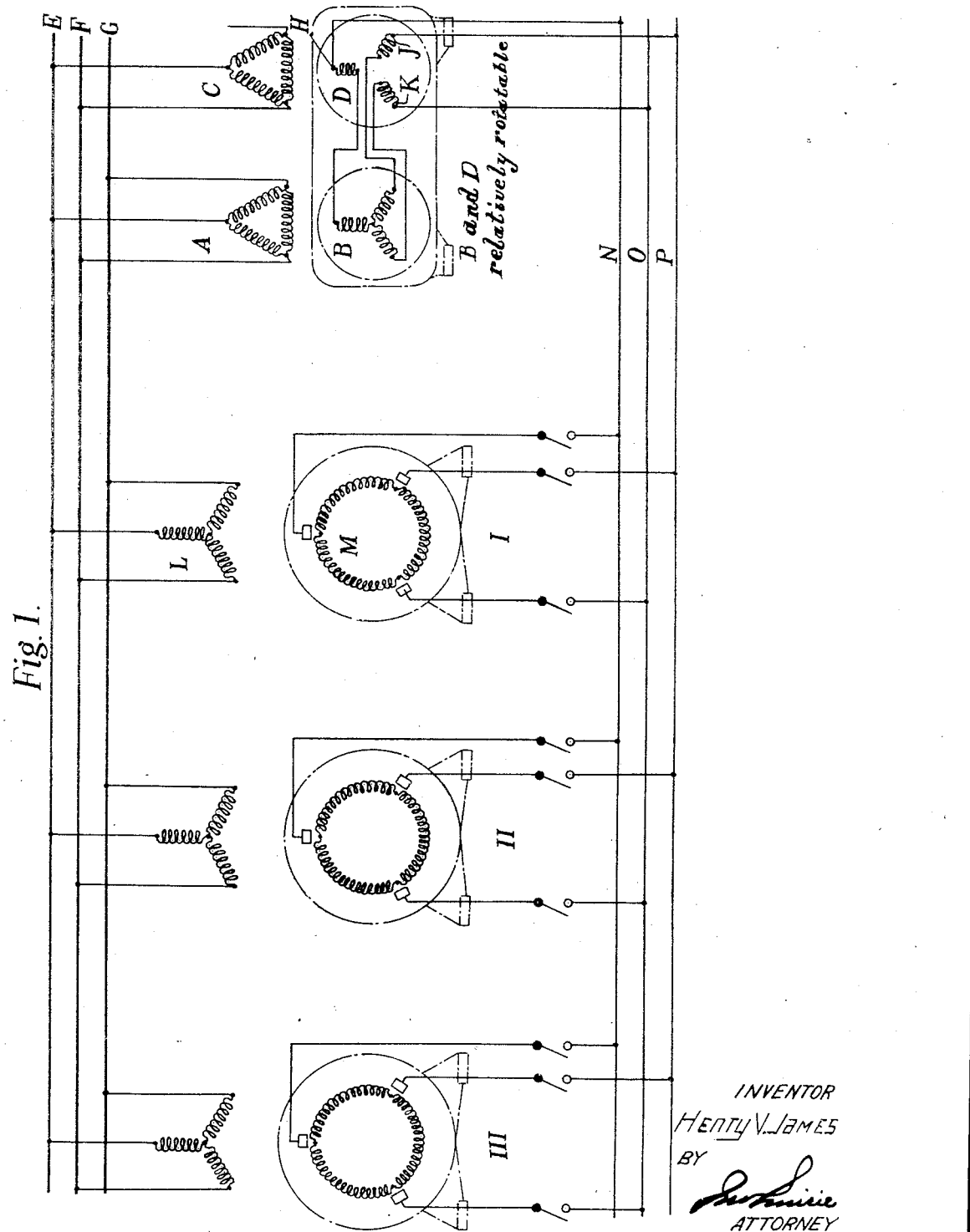

INVENTOR
Henry V. James
BY
ATTORNEY

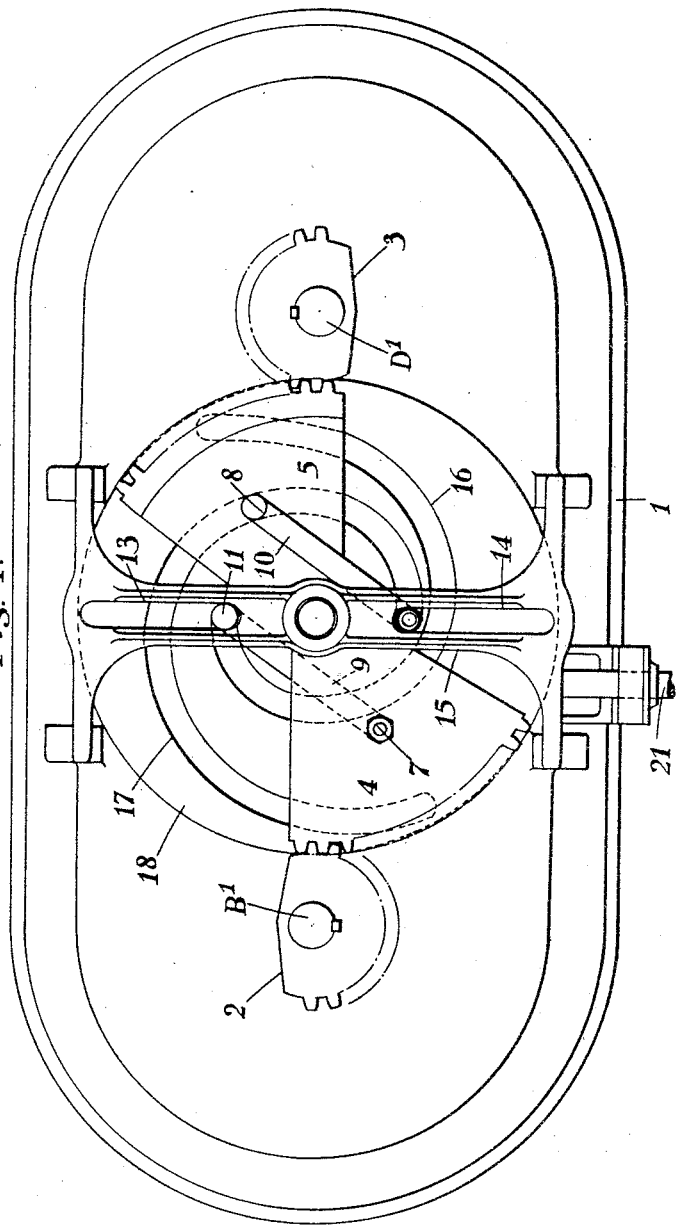

Inventor
Henry V. James

Patented Nov. 23, 1937

2,099,890

UNITED STATES PATENT OFFICE 2,099,890

MEANS FOR REGULATING THE SPEED OF POLYPHASE ALTERNATE CURRENT MOTORS

Henry Vincent James, Radlett, England

Application October 15, 1934, Serial No. 748,398
In Great Britain and Northern Ireland October 24, 1933

2 Claims. (Cl. 172—274)

The invention is directed to improved means for regulating the speed of polyphase alternate current motors of the induction type with a commutator having fixed brush position, and is particularly concerned with the driving of multiple unit line type printing presses.

It is usual at the present time to drive the units of these printing presses by means of polyphase commutator type motors which are speed regulated by brush movement on the commutators, functioned by a small motor to develop the required speed regulation which have a great disadvantage in the necessity of a mechanical coupling between sets of brush gear of the various motors driving in parallel to ensure their taking up an equal share of the load, combined with the difficulty of arranging and housing such necessary gear, also the frequent correct mechanical coupling up of same as required to meet the various groupings of the press units.

According to the present invention a multiple unit line type printing press has its units individually driven by electric motors of the commutator type, but in order to overcome the disadvantages associated with this drive as set forth in the preceding paragraph, the rotors are simultaneously and similarly controlled by a double induction regulator which is electrically connected to them and which has the movable members of its two parts coupled to a driving device arranged to produce displacement of the said members at different rates, the said regulator being energized from constant supply.

When a press is constructed according to the present invention there is no difficulty in using some or all of the said motors in parallel and driving them in synchronism with one another; they automatically take up an approximately equal share of the load at various speeds when controlled from the regulator which latter can be made to inject various E. M. F.'s of like value to all motors and in correct phase relationship.

The invention will now be described with reference to the accompanying drawings wherein:—

Fig. 1 shows diagrammatically the circuit arrangement of the induction regulator controlling a number of commutator motors, for example, motors driving the printing units of a multiple line-type printing press.

Fig. 4 is a plan view of this device with the cover thereof removed.

Figures 2, 3:
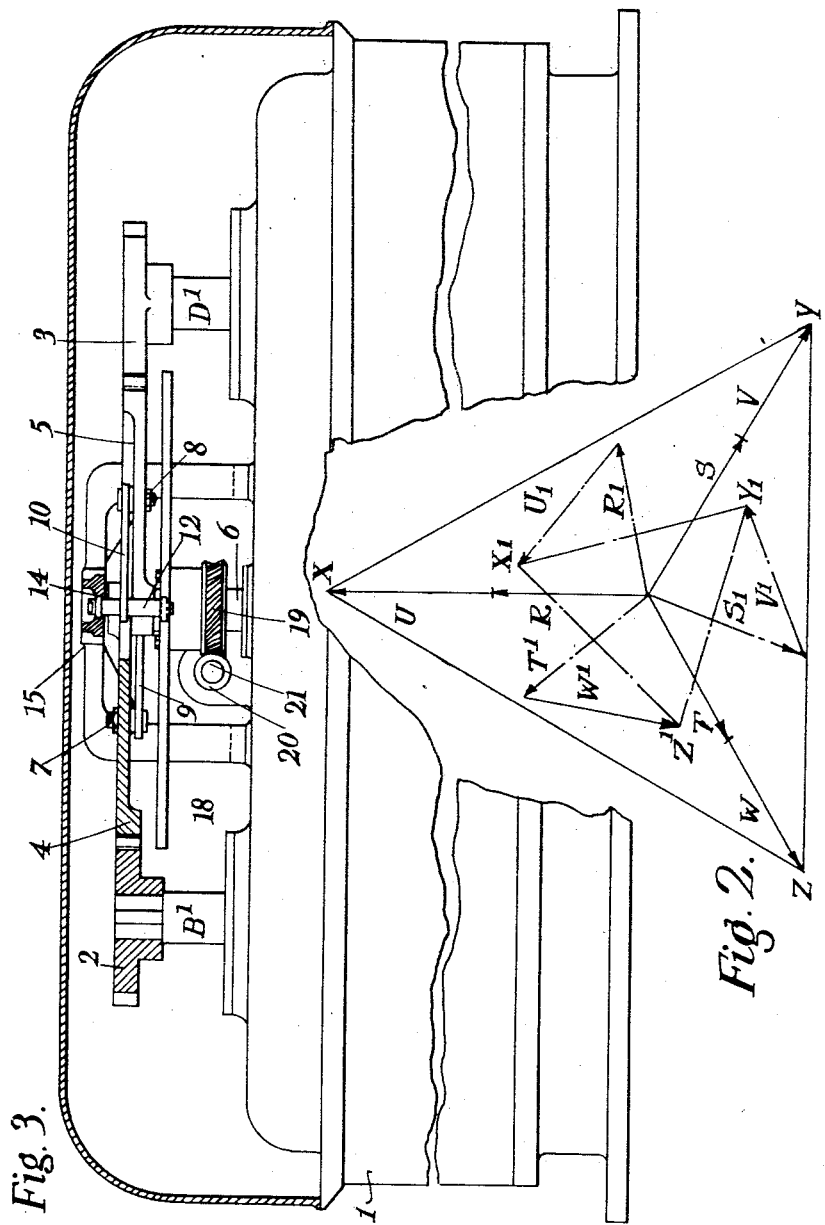
Fig. 2 is a vector diagram showing how injected voltage and phase are affected by the present regulator.
Fig. 3 is a side elevation, partly in section, of a mechanical device for effecting the differential and independent relative movements of the secondary members.
Figure 5:
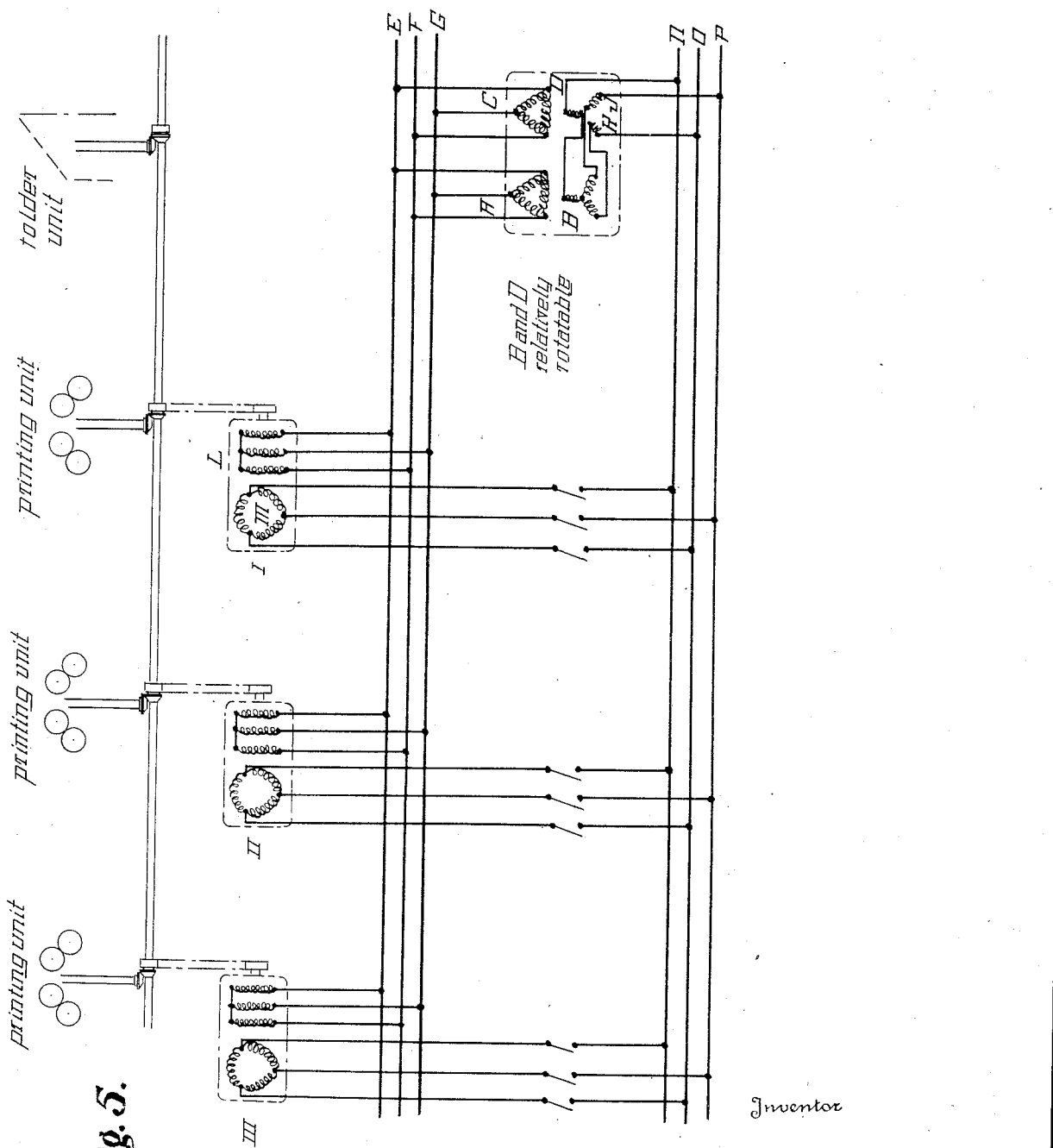
Fig. 5 shows diagrammatically the circuit arrangement of the induction regulator in connection with motors driving the printing units of a multiple line type printing press.

In Fig. 1 the induction regulator consists of two primary members A and C, respectively, and two secondary windings B and D associated one with A and the other with C.

The parts A, B and C, D resemble ordinary induction motors in that each comprises a primary winding on one core and a secondary winding on another and relatively rotatable core.

The two primary windings A, C are connected to the normal electricity supply E, F, G. The secondary winding B is star connected and the three phase windings of the secondary winding D are connected in series with those of B. The windings B and D are adapted to be relatively and independently rotated.

The commutator motors I, II, III are of well known construction each comprising a primary winding L fed from the same source of supply as the primary windings of the induction regulator, and a secondary winding M connected to a commutator provided with appropriate sets of collector brushes. These collector brushes are fed from the controlling busbars N, O, P energized from the terminals H, J, K of the induction regulator.

It is well known that commutator motors as described can be speed regulated by appropriate regulation of the voltage applied to the commutator collector brushes, and further that a suitable variation in the phase relationship of the voltage injected into the secondary winding will effect power factor improvement. The present invention enables such speed regulation and power factor improvement to be carried out as will appear from the following description taken in conjunction with the vector diagram in Fig. 2. This diagram relates only to the secondary voltages of the regulator, R, S, T representing the voltages in the member B of the induction regulator and U, V, W the voltages in the member D. If the angular positions of the two members of the regulator are suitably determined the voltages produced from the two members will be directly assisting each other as shown in full lines, Fig. 2, and will give at the terminals H, J, K (Fig. 1) of the regulator voltages corresponding to the vectors X, Y, Z. This condition gives the maximum voltage which can be obtained from the regulator.

If the angular positions of the two members B, D of the regulator are now adjusted so that the phase relationship of the vectors R, S, T is changed, for example, to R1, S1, T1 and the vectors U, V, W to U1, V1, and W1, the resultant voltages which will be obtained from the terminals H, J, K will now be represented by vectors X1, Y1 and Z1.

It will be clearly seen that the result of this angular movement of the said two members of the regulator has been to reduce the voltage obtainable from its terminals H, J, K and at the same time to vary the phase relationship of this voltage to the supply voltage.

It will be further seen that if each member B, D of the regulator is arranged for an angular regulation of 180 electrical degrees it will be possible to vary the voltage obtained from the regulator from the maximum value as represented by vectors X, Y, Z down to zero, and further to produce reverse voltages to the same maximum value corresponding to X, Y, Z. Also, that these voltages can be produced at any phase relationship to the supply voltage.

Referring again to Fig. 1 it will now be seen that a suitably designed regulator when applied for the speed regulation of the three phase commutator type motors will produce continuous speed regulation of the motors and by the simultaneous variation of the phase relationship of its injected voltage will produce any desired power factor correction to the system.

It will also be seen that any number of identical commutator motors within the capacity of the induction regulator could be simultaneously regulated, and as they will each be fed from the same controlling voltage will automatically receive the same regulation and will, therefore, automatically share the loading if they are mechanically coupled to a common drive.

An example of such an application occurs in the multiple unit driving system of line type unit presses where each printing unit has its individual motor required to be driven in parallel from time to time with variable numbers of other motor units associated in combination with same as determined by the page size of the product and so on.

In the practical application of this type of induction regulator it is necessary to provide means whereby the two members of the induction regulator are suitably coupled together for their relative and appropriate angular control; and in Figs. 3 and 4 is diagrammatically illustrated a suitable method for effecting this control.

The primary and secondary members such as A—C and B—D are contained within a housing 1 which has bearings for shafts B' and D' carrying cores (not shown) provided with windings B and D. The windings are arranged to be driven through an angular movement by pinions 2 and 3 engaging with quadrants 4 and 5 which are mounted on a common stub axle 6 carried by the case 1.

These quadrants 4 and 5 are connected by means of pins 7 and 8 and links 9, 10 to pins 11 and 12 sliding in guides 13 and 14 in a yoke 15 which straddles the top of the case 1.

These pins 11 and 12 enter cam shaped slots 16 and 17 cut in disc 18 rotatably mounted on stub axle 6. The disc 18 is rigid with a worm wheel 19 meshing with a worm 20 mounted on shaft 21. The shaft can be arranged for hand or motor operated control for the purpose of effecting rotation of the disc.

When the disc 18 is rotated the cam shaped slots engaging the pins 11 and 12 will cause these to move in the guides 13 and 14 and to turn the quadrants 4 and 5, so as to impart angular displacement to the two movable members of the regulator by means of the pinions 2, 3 and shafts B', D'.

It will be clear that the cam shaped slots 16 and 17 can be cut to any desired shape so as to give the required angular regulation of both members of the induction motor to suit any application, the shapes of said slots being determined by experiment.

What I claim is:—

1. A double induction regulator for a plurality of electric motors of the alternating current commutator type where said motors are allocated each to an individual unit of a multiple unit line type printing press, said double induction regulator electrically connected in parallel to the rotors of said motors and energized from constant supply, said regulator having movable control members, and a driving device comprising quadrants for driving said control members, a disc rotatable on the axis of the quadrants, cam grooves in said disc, links connected to the quadrants and movable in the cam grooves, means for guiding the cam groove connected ends of the links in right lines, and means for operating the disc.

2. A double induction regulator for a plurality of electric motors of the alternating current commutator type where said motors are allocated each to an individual unit of a multiple unit line type printing press, said double induction regulator electrically connected in parallel to the rotors of said motors and energized from constant supply, said regulator having movable control members, and a driving device comprising quadrants for driving said control members, a disc rotatable on the axis of the quadrants, cam grooves in said disc, links connected to the quadrants and movable in the cam grooves, means for guiding the cam groove connected ends of the links in right lines, and means for operating the disc, the cam grooves being of relatively different shapes whereby to produce displacement of the control members at different rates.

HENRY VINCENT JAMES.